(12) United States Patent
Wilden et al.

(10) Patent No.: US 10,045,396 B2
(45) Date of Patent: Aug. 7, 2018

(54) WIRELESS MESH NETWORK USING PLURAL RADIO CHANNELS

(75) Inventors: Jason Joseph Wilden, South Jordan, UT (US); Mark Steven Geoghegan, West Chester, OH (US); Jefferson Dean Lexa, Jackson, OH (US); Daniel Paul Engel, Farmington Hills, MI (US)

(73) Assignee: S&C Electric Company, Chicago, IL (US)

( * ) Notice: Subject to any disclaimer, the term of this patent is extended or adjusted under 35 U.S.C. 154(b) by 0 days.

(21) Appl. No.: 13/521,609

(22) PCT Filed: Jan. 13, 2010

(86) PCT No.: PCT/US2010/020920
§ 371 (c)(1),
(2), (4) Date: Aug. 3, 2015

(87) PCT Pub. No.: WO2011/087498
PCT Pub. Date: Jul. 21, 2011

(65) Prior Publication Data
US 2013/0201869 A1    Aug. 8, 2013

(51) Int. Cl.
*H04W 84/18* (2009.01)
*H04W 56/00* (2009.01)
*H04W 76/02* (2009.01)

(52) U.S. Cl.
CPC ......... *H04W 84/18* (2013.01); *H04W 56/002* (2013.01); *H04W 76/025* (2013.01)

(58) Field of Classification Search
CPC ......... H04L 41/12; H04L 45/02; H04L 45/04; H04L 41/04
USPC .................................. 370/254, 310
See application file for complete search history.

(56) References Cited

U.S. PATENT DOCUMENTS

2010/0075611 A1* 3/2010 Budampati et al. ........ 455/67.11
2011/0222628 A1* 9/2011 Chun et al. .................... 375/295
2014/0044120 A1* 2/2014 Park et al. ..................... 370/350

* cited by examiner

*Primary Examiner* — Andrew Lai
*Assistant Examiner* — Zhiren Qin

(57) ABSTRACT

Communications links can be established between a plurality of communications nodes to form an at least partially connected mesh network. Establishing a link can include transmitting synchronization data from a first communications node. The synchronization data can be transmitted symbol synchronously on a plurality of narrowband radio channels. A second communications node can combine energy received from the plurality of narrowband radio channels and use the combined energy to synchronize to the first communications node. Data transmissions can be demultiplexed by the first communications node into a plurality of lower rate streams for transmission across the plurality of narrowband radio channels. The second communications node can receive and multiplexed back together the lower rate streams.

32 Claims, 5 Drawing Sheets

WIRELESS MESH NETWORK USING PLURAL RADIO CHANNELS

FIELD

The present application relates to wireless communications systems. More particularly, the present application relates to wireless mesh networks using a plurality of radio channels.

BACKGROUND

Various types of systems can benefit from monitoring and control networks. For example, electrical power distribution systems can benefit from monitoring and control networks that can rapidly identify and correct problems. Such a monitoring and control network can be implemented using a variety of techniques, including for example, a wireless communications system. If rapid identification and correction of problems in the monitored system is desired, it is desirable for the wireless communication system to provide high data rates and low latency.

Present trends in wireless communications systems are to provide increasingly high data rates through the use of wider bandwidth channels. For example, cellular systems have migrated from channel bandwidths of tens of kilohertz (kHz) to channel bandwidths of one megahertz (MHz) and greater to provide higher data rates.

Unfortunately, in some industries, wideband channels are not available for use in a wireless communication network. For example, in some jurisdictions, systems must operate within legacy narrowband channel allocations of less than 100 kHz (e.g., 25 kHz or even 12.5 kHz). Providing desired data rates and latency using such narrowband channels is difficult or impossible.

SUMMARY

In some embodiments of the invention, a method of communications in a wireless mesh network having a plurality of communications nodes is provided. The method can include selecting multiple narrowband radio channels from a predefined radio spectrum range. The selected narrowband radio channels can be non-contiguous. The method can also include establishing wireless communications links between the communications nodes. The wireless communications links can form an at least a partially connected mesh network. Establishing each wireless communications link can include transmitting synchronization data from a first communications node to a second communications node. The synchronization data can be transmitted symbol-synchronously across at least two of the radio channels. The second communications node can combine energy received on the at least two radio channels to provide a combined signal. The second communications node can use the combined signal to synchronize to the first communications node.

In some embodiments of the invention, a wireless communications system is provided. The system can include a plurality of communications nodes. The system can also include a means for establishing a plurality of wireless communications links between the plurality of communications nodes to form an at least partially connected mesh network. The means for establishing can include means for transmitting synchronization data from a first one of the communications nodes via at least two non contiguous narrowband radio channels. The synchronization data can be transmitted symbol-synchronously across the at least two narrowband radio channels. The means for establishing can include a means for combining energy received from the at least two narrowband radio channels at a second communications node. The means for establishing can also include a means for synchronizing the second one of the plurality of communications node to the first one of the plurality of communications nodes using a combined signal from the means for combining energy.

In some embodiments of the invention, a communications node is provided. The communications node can include a demultiplexer, a transmit subsystem, a receive subsystem, and a multiplexer. The demultiplexer can demultiplex data at a first data rate into a plurality of transmit data streams at a second data rate. The second data rate can be less than the first data rate. The transmit subsystem can include multiple transmitters, each of the transmitters capable of transmitting one of the transmit data streams on a different, non-contiguous one of a plurality of narrowband radio channels. The transmissions from the transmitters can be symbol synchronous with each other. The receiver subsystem can include multiple receivers, each of the receivers capable of receiving a receive data stream at a third data rate. Each receive data stream can be received on a different, non-contiguous one of the plurality of narrowband radio channels. The receive data streams can be symbol synchronous with each other. The multiplexer can multiplex the receive data streams together into data at a fourth data rate. The fourth data rate can be greater than the third data rate.

BRIEF DESCRIPTION OF THE DRAWINGS

Additional features and advantages of the invention will be apparent from the detailed description that follows, taken in conjunction with the accompanying drawings, that together illustrate, by way of example, features of the invention; and, wherein.

DETAILED DESCRIPTION

Figure 1:
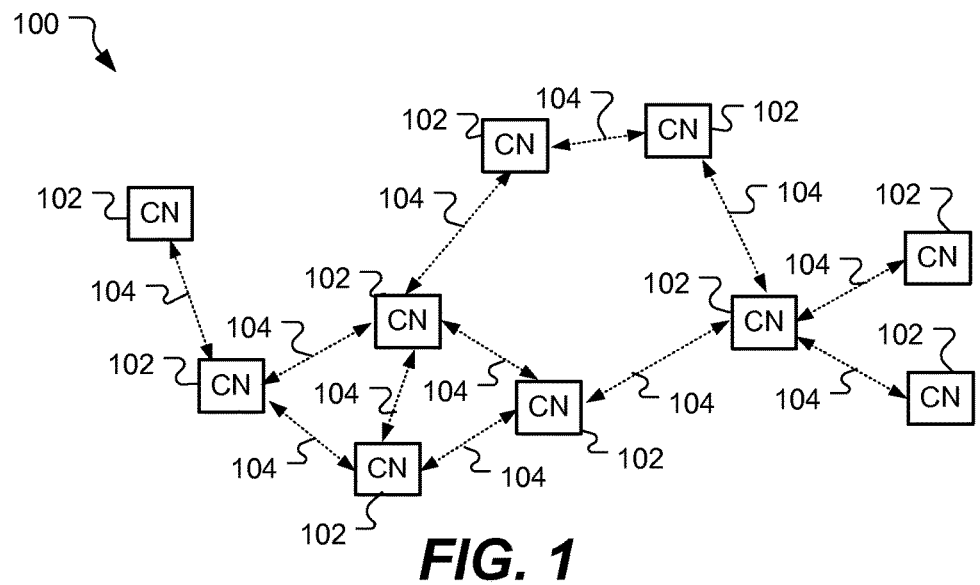
FIG. 1 is a block diagram of a system in accordance with some embodiments of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In describing the present invention, the following terminology will be used:

The singular forms "a," "an," and "the" include plural referents unless the context clearly dictates otherwise. Thus, for example, reference to a communications node includes reference to one or more communications nodes.

The term "ones" refers to one, two, or more, and generally applies to the selected of some or all of a quantity. The term "plurality" refers to two or more of an item.

As used herein, the term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art.

As used herein, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. As a particular example, time synchronization of radio signals is dependent upon propagation delays, and thus synchronization can be dependent upon relative position of transmission and reception devices. Clocks within two terminals may be synchronized to the extent that they operate at about the same rate or frequency, but the clocks may have differing time or phase due to propagation delays between the two terminals.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., greater than about 1) and should apply regardless of the breadth of the range or the characteristics being described.

As used herein, a plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items.

As used herein, the term "alternatively" refers to selection of one of two or more alternatives, and is not intended to limit the selection to only those listed alternatives unless the context clearly indicates otherwise.

Turning to FIG. 1, a system is illustrated in accordance with some embodiments of the present invention. The system, shown generally at 100, can include a plurality of communications nodes 102. The communications nodes can provide a means to establish wireless communications links between each other to form an at least partially connected mesh network as will be explained below.

A plurality of wireless communications links 104 can be established within the system 100. For example, a communications node 102 can be capable of communicating with other communications nodes that are within range. The resulting connectivity within the system can be referred to as mesh connectivity, since direct communications between communications nodes is possible (in contrast to a hub and spoke network, wherein all spoke nodes are connected only via a common hub node). The resulting connectivity can also be referred to as a partially-connected mesh network, since not every communications node will necessarily be capable of direct communications with every other node. Of course, if all of the communications nodes are within range of each other, a fully connected mesh network can be obtained.

Transmissions on the communications links 104 can use a carrier sense multiple access (CSMA) techniques to minimize or avoid collisions between different communications nodes transmitting at the same time on the same narrowband radio channels. For example CSMA with collision avoidance (CA) similar to that used in the IEEE 802.11 standards can be used.

Figure 2:
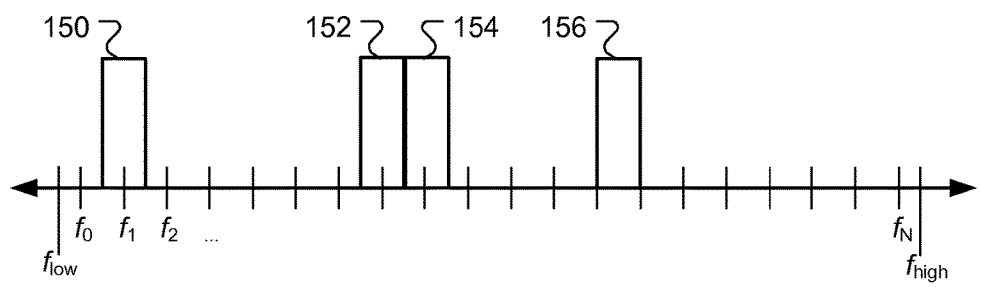
FIG. 2 is an illustration of a predefined radio spectrum range in which a plurality of narrowband radio channels are defined.

The communications links 104 can use a plurality of narrowband radio channels. The plurality of narrowband radio channels can be used to provide high data rate, low latency communications as will be described in further detail below. The plurality of narrowband radio channels can define a non-contiguous portion of a predefined radio spectrum range. For Example, FIG. 2 illustrates a predefined radio spectrum range extending from $f_{low}$ to $f_{high}$. A plurality of narrowband radio channels are defined by their center frequencies $f_0, f_1, \ldots f_n$. Each narrowband radio channel has a bandwidth bw. For example, bw can be less than 125 kHz (e.g., 25 kHz or 12.5 kHz). Thus, an allocation of four channels (e.g., channels 150, 152, 154 and 156 in FIG. 2) can provide a total bandwidth of 4*bw, although the bandwidth is not contiguous. Thus, the allocated channels define a non-contiguous portion of the predefined radio spectrum range. For example, channels 152 and 154 are adjacent, however a gap is present between channel 150 and channel 152. Another gap is present between channel 154 and channel 156. Other radio frequency spectrum users may be present in these gaps. Of course, various other arrangements can be used, including where none of the narrowband channels are adjacent, some of the narrowband channels are adjacent, or all of the narrowband channels are adjacent. The selecting of which channels are used may be based on an allocation from a spectrum licensing authority, or may be determined by a system user. Channel selections may be input to the system by the system user.

The communications nodes 102 can include multiple transmitters and multiple receivers to provide for communications over the multiple channels. For example, establishing a communications link between a first communications node and a second communications node can proceed as follows. The first communications node can transmit synchronization data across multiple ones (e.g., at least two) of the narrowband radio channels. The synchronization data can be synchronized across the multiple radio channels. At the second communications node, energy received via the multiple radio channels can be combined and used to synchronize the second communications node to the first communications node. By combining synchronization data from multiple narrowband radio channels, detection and synchronization time can be reduced as compared to detecting and synchronizing transmissions on a single narrowband channel. Further details on synchronization are provided below.

High rate data can also be transmitted between the communications nodes. For example, a high rate data stream (e.g., at a first data rate) provided to the first communications node can be demultiplexed into multiple (e.g., at least two) lower data rate streams (e.g., at second data rates lower than the first data rate). For example, a 160 kilo-bit-per-second (kbps) stream can be split into four 40 kbps streams. As another example, a 160 kbps stream can be split into an 80 kbps stream, a 40 kbps stream, and two 20 kbps streams. Each lower data rate stream can be transmitted over a different one of the narrowband radio channels. Symbol timing on the multiple narrowband radio channels can be synchronized together. At the second communications node, the lower rate streams can be received. The received lower data rate data can be multiplexed back together into a high rate stream. As a particular example, using four narrowband radio channels, each having a bandwidth of about 12.5 kHz, a data rate of at least 40 kbps can be provided by transmitting at 10 kbps on each of the narrowband channels.

Figure 3:
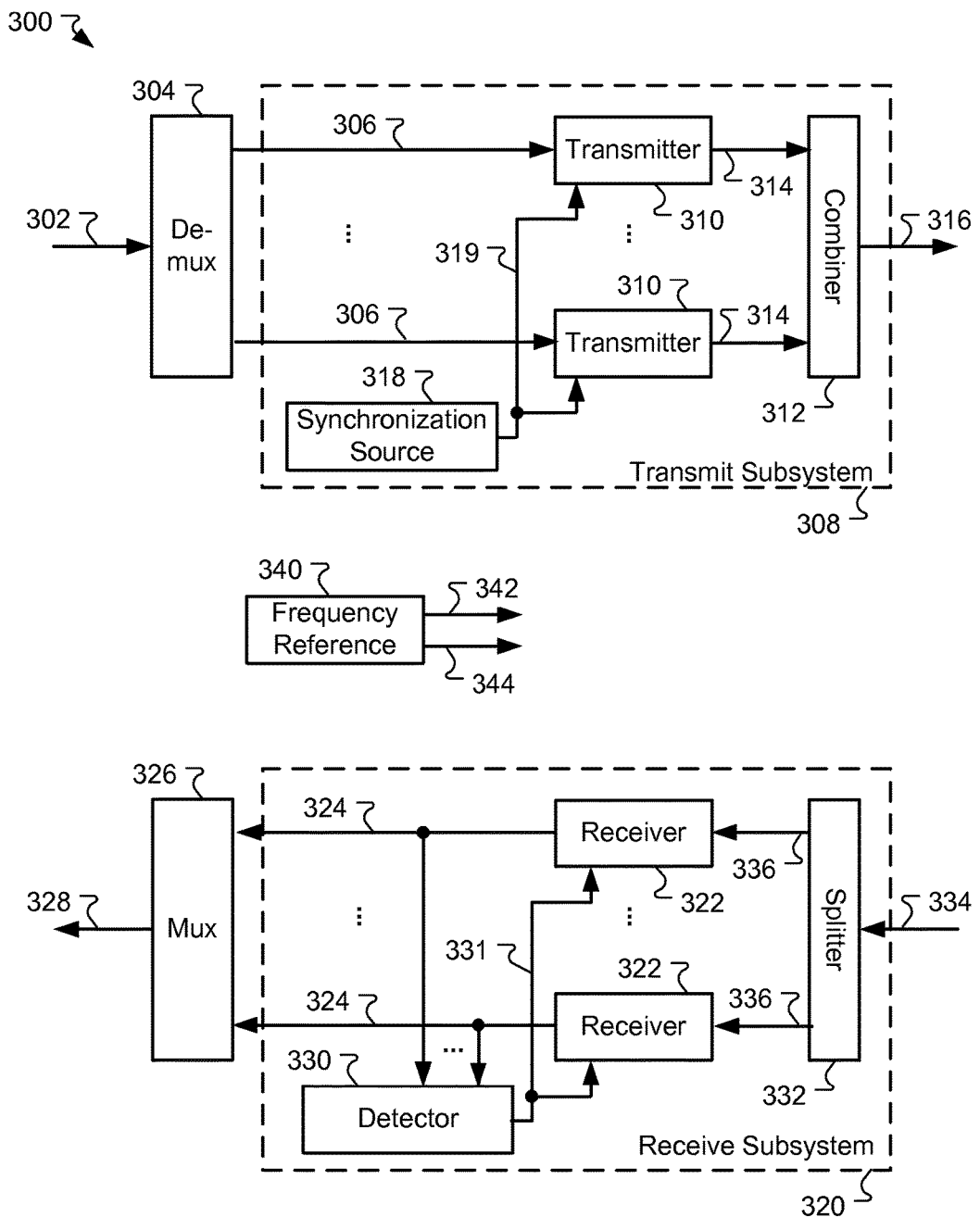
FIG. 3 is block diagram of a communications node in accordance with some embodiments of the present invention.

A block diagram of a one embodiment of a communications node is provided in FIG. 3. The communications node 300 can, for example, be used in the system 100 of FIG. 1. The communications node can include an input 302 which accepts data. For example, the data can be at a first data rate. A demultiplexer 304 can take the data and split it into a plurality of data streams 306 each at a second data rate, where the second data rate is less than the first data rate. Various patterns can be used for the demultiplexing. For example, when demultiplexing into two streams, data symbols can be alternately supplied to each of the two streams. Any desired pattern can be used for the demultiplexing/multiplexing provided that the pattern is known to both the transmitting and receiving communications node. The data streams can be provided to a transmit subsystem 308. The transmit subsystem can include a plurality of transmitters 310. Although two transmitters are shown, the number of transmitters can be more that two (e.g., three, four, etc.). Each transmitter can be capable of transmitting one of the data streams on a different one of a plurality of narrowband radio channels. As discussed above, the narrowband radio channels need not be contiguous.

If desired, the transmit subsystem 308 can include a combiner 312 coupled to the radio frequency outputs 314 of the transmitters. The combiner can combine the radio frequency signals into a single transmit output 316. For example, the output can be connected to an antenna (not shown).

The communications node 300 can also include a receive subsystem 320 connected to a receive input 334. The receive subsystem can include a plurality of receivers 322 coupled to the receive input 334 via a splitter 332. Although two receivers are shown, the number of receivers can be more than two e.g., three, four, etc.). Generally, the number of receivers will be equal to the number of transmitters 310, although this is not essential. The receivers can each be capable of receiving a receive data stream on a different one of the plurality of narrowband radio channels. The receivers can receive data streams 324 at a third data rate and provide the data streams to a multiplexer 326. The multiplexer can combine the data streams into a single data stream 328 at a fourth data rate which is higher than the third data rate. The first data rate can be equal to the fourth data rate, and the second data rate can be equal to the third data rate, although this is not essential. The data rates can be fixed, or can vary during operation as will be described further below. The data rate of each stream can be the same as each other, or different data rates can be used on the streams.

The communications node 300 can be used to establish a wireless communications link as will now be explained. The transmit subsystem 308 can include a synchronization source 318 coupled to the transmitters 310. Synchronization data can be transmitted on the narrowband radio channels under control of the synchronization source. For example, the synchronization source 318 can provide synchronization data and timing 319 to the transmitters. The synchronization data can be transmitted symbol-synchronously across the channels. For example, predefined symbol values (e.g., particular phases, frequencies, amplitudes, etc.) can be transmitted by each of the transmitters, and the same symbol values can be transmitted at the same time by each of the transmitters.

At a second communications node, the synchronization data can be received using the receive subsystem 320. The receive subsystem can include a detector 330 configured to combine energy received across the narrowband radio channels and use the combined energy to detect a beginning of a transmission. The detector can also be used to define symbol timing 331 for the receivers 322 so that the receivers are synchronized to the transmitters. Because the synchronization symbols are transmitted with the same symbol timing on each of the plurality of narrowband radio channels, the energy can be combined. Thus, the communications node 300 can be an example of means for establishing wireless communications links, the transmit subsystem 308 can be an example of a means for transmitting synchronization data from a first communications node, and the receive subsystem 320 can be an example of a means for combining energy received at a second communications node and a means for synchronizing the second communications node to the first communications node.

As a particular example, the detector can operate as follows. The synchronization data can be a predefined symbol sequence. A correlation can be performed between the signal received on each channel and the predefined symbol sequence. Various ways of performing a correlation can be used, including for example, digital circuits which perform a multiply-and-accumulate, digital signal processors, and other implementations. The results from the correlations on each channel can be summed together (e.g., summing the correlation results of each channels for each different time hypothesis for which a correlation is performed). The combined correlation result can then be used to determine when a data transmission is being received (e.g., by comparing the correlation result to a threshold). This has the effect of combining the energy on the multiple narrowband radio channels, resulting in a performance improvement relative to a correlation performed on a single narrowband radio channel.

Time synchronization can also be determined from the combined correlation result, since the peak of the combined correlation result indicates proper time alignment to the transmitted synchronization symbols. If desired, correlation results from individual channels can be used to provide timing for each individual channel.

Frequency synchronization can also be determined from synchronization data. All of the transmitters in a communications node can be tied to a common frequency reference in the communications node, hence any transmitted frequency offsets on each of the narrowband radio channels will be related to each other. Similarly, all of the receivers in a communications node can be tied to a common frequency reference in the communications node, and hence any frequency offset in reception will be related for each of the narrowband radio channels. Thus, frequency synchronization can be determined from the combined correlation result, or from the correlation result on any one of the narrowband radio channels and applied to each of the receivers.

If desired, phase synchronization can be determined from the synchronization data. Phase synchronization can be estimated separated for each channel, since the resulting phase on each channel may be quite different (as it is a function of the actual radio frequency and propagation distance between the transmitter and the receiver).

The transmitters 310 within the transmit subsystem 308 can be implemented in a modular manner which provides for expandability of the transmit subsystem. For example, four transmitters 310 can be provided on a single module (e.g., a circuit board). The transmit subsystem can thus be configured to provide 4, 8, 12, 16, etc. transmitters by using 1, 2, 3, 4, etc. modules. This expandability can allow for scaling of a basic system design to different applications which may provide different numbers of channels, and hence different data rates.

Similarly, the receivers 322 within the receive subsystem 320 can be modular. Thus, a module can include a plurality of transmitters, a plurality of receivers, or both. By installing a variable number of modules into the communications node, a desired number of transmitters and receivers can be obtained.

The communications node 300 can also include a frequency reference 340. The frequency reference can be used to generate local oscillator signals (not shown) used in transmitting and receiving radio frequency signals. More than one frequency reference can be provided if desired, for example, a frequency reference can be provided with each module having a plurality of transmitters and/or receivers.

Figure 4:
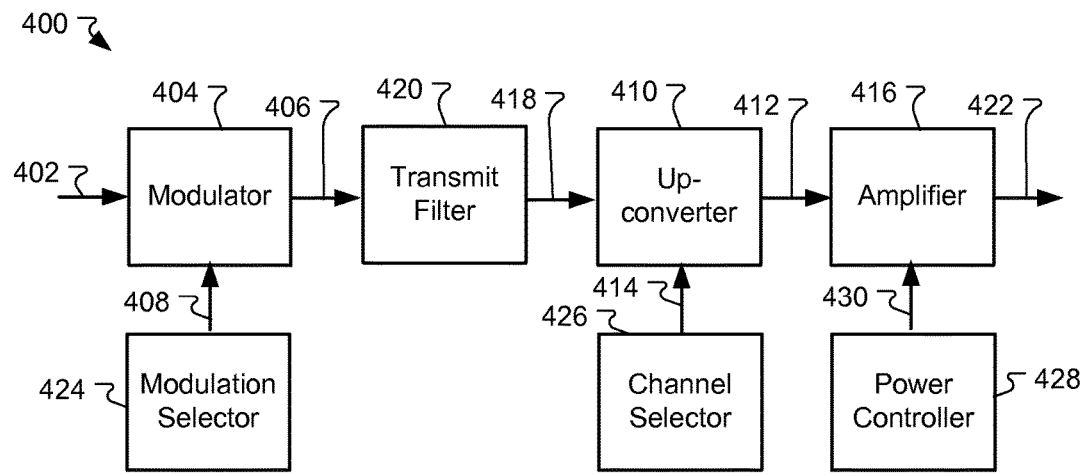
FIG. 4 is a block diagram of a transmitter in accordance with some embodiments of the present invention.

FIG. 4 provides detailed example of a transmitter 400 according to some embodiments of the invention. The transmitter 400 can be an example of the transmitter 310 (FIG. 3). Thus, multiple transmitters 400 can be used in a transmit subsystem 308 (FIG. 3). The transmitter can accept data 402 for transmission. Data can be, for example, data provided to a communications node for transmission or synchronization data generated internally within the communications node. The data can be modulated by a modulator 404 to produce a modulated signal 406. The modulator can include a modulation selection control 408 which is used to define the modulation to be used. Various modulation formats can be used including, for example, phase modulation, amplitude modulation, and frequency modulation. Modulation formats can be binary, quaternary, or M-ary. The modulator can include an encoder (not shown) to add structured redundancy to the data stream prior to modulation.

The modulated signal 406 can be provided to a transmit filter 420 to produce a filtered modulated signal 418. For example, the transmit filter 420 can provide filtering to help to ensure that a predefined narrowband channel spectral containment mask is met. Alternatively, or in addition, shaping of the modulation within the modulator can help to ensure that the predefined narrowband channel spectral containment mask is met. For example, the modulator can be implemented using digital circuitry and a digitally modulated signal converted into an analog form to provide the modulated signal. The transmit filter can also help to provide reconstruction filtering on the modulated signal.

The filtered modulated signal 418 can be provided to an upconverter 410. The upconverter can upconvert the filtered modulated signal to produce a radio frequency signal 412 at a desired transmit frequency. The desired transmit frequency can be specified by channel control input 414 to the upconverter. The radio frequency signal 412 can be amplified by amplifier 416 to produce an output signal 422. The output power level of the amplified radio frequency signal can be controlled by power control input 430.

When a plurality of transmitters 400 are used, each transmitter can be set to a different channel, and thus provide an output signal 422 centered on a desired transmit frequency. The output signals can be combined into a single antenna for transmission. Since each transmitter includes a transmit filter 420, each of the signals generated by each transmitter is separately filtered. This can be beneficial in ensuring that the spectral containment mask requirements are met. For example, narrowband radio channels often have extremely stringent spectral containment mask requirements to be met. Such stringent requirements can be difficult to meet using other techniques (e.g., modulation pulse shaping alone) without including filtering on each transmitter.

The transmitter 400 can include a means for selecting a modulation format, for example, a modulation selector 424. The modulation selector can be used to select the modulation format to be used by the modulator 404. The modulation selector can select the modulation based on any one or more of a number of criteria. For example, the modulation can be varied based on a destination at which the data is to be received, a source from which the data is being transmitted, or a signal to noise ratio at the intended receiver. For example, the source (transmitting) communications node, destination (receiving) communications node, or both may have limited capabilities that require particular modulation formats to be used. As another example, the modulation format can be selected based on communications conditions on the communications link between the source and destination (e.g., receive signal to noise ratio at the destination). For example, when a high signal to noise ratio is present at the destination, a higher order modulation format can be used which provides higher data rates. Conversely, when a low signal to noise ratio is present at the destination, a lower order modulation format can be used which provides lower bit error rate. The destination can provide feedback to the source to identify the signal to noise ratio present. Various modulation formats can be used, including for example, M-ary differential phase shift keying, wherein different values of M (e.g., M-2, 4, 8, 16 etc.) correspond to different modulation formats, although the invention is not limited to this particular example.

The transmitter 400 can include a means for selecting the narrowband radio channels, for example, a channel selector 426. The channel selector can be used to select the narrowband radio channel on which the transmitter will operate. For example, the narrowband radio channels can be defined for an entire network (e.g., specifying frequencies for each of the plurality of transmitters in a communications node). As another example, particular narrowband radio channels can be defined for each wireless communications link (e.g., particular combination of a source communications node and destination communications node). As another example, a predefined plurality of narrowband channels can be assigned to a network, and one or more of the channels used for each communications link. The channels used for each link can be selected based on a destination at which the data is to be received, a source from which the data is being transmitted, or communications conditions on the communications link between the source and destination (e.g., receive signal to noise ratio at the destination). For example, a particular source communications node may be unable to transmit on particular ones of the narrowband radio channels (e.g., to avoid causing cosite interference or other constraints). As another example, a destination communications node may be unable to receive on particular ones of the narrowband radio channels (e.g. due to local interference on a channel or other constraints). As yet another example, certain channels may be unusable due to signal to noise ratio constraints. Information as to such constraints on channel selections can be stored in a table within a memory in the channel selector 426.

The transmitter 400 can include a power controller 428. The power controller can be used to determine a transmission power level. For example, the transmission power level can be based on the destination of the data. As another example, transmission power can be varied based on the distance to the destination, using higher transmission power levels for more distant destinations. As yet another example, the power controller can vary transmission power level based on a signal to noise ratio at the destination of the data.

As a particular example, a communications node can keep a list of all the other communications nodes to which it has established a wireless communications link. These nodes can be referred to as neighboring nodes. Transmission power level to each node can be adjusted to provide a desired receive signal strength (e.g., a minimum receive level plus a desired margin). The transmission power level to be used when transmitting to each node can be stored in the table in a memory within the power controller 428. Transmission of messages to a node can use the transmission power level stored in the table. When attempting transmission to a node not in the table (e.g., a node which has not had a communications link established), transmission can be at the maximum power level. In addition, broadcast transmissions can be sent at a maximum power level.

The power controller 428 can also vary transmission power level based on the priority of the data. For example, various different types of data can have different priorities. Highest priority messages can be transmitted at the maximum power level. This can help to ensure the broadest and most reliable dissemination of fault messages. Moderate and low priority messages can be transmitted using power levels determined by routing considerations as discussed further below. Priority of the data can be identified by a predefined field within the data. For example, the data can be formatted as Internet Protocol (IP) packets, and header information within the packet used to identify the priority of the data.

The power controller 428 can also vary transmission power level based on routing considerations. For example, in a mesh network, it can be possible to vary the number of immediate neighbors to which communications links can be established from a node by varying the transmit power level. For example, higher transmit power generally provides longer ranges, and thus can provide for communications links to a larger number neighboring nodes. In some situations, it can be desirable to reduce the number of nodes to which communications links are established by reducing the amount of power. Accordingly, the transmission power level can be varied to establish a desired number of communications links.

For example, a target number of nodes can be specified for a communications node. The communications node can periodically check the number of nodes to which it has established communications links. For example, establishing communications links can include each node periodically transmitting a beacon, and neighboring nodes which receive the beacon transmission noting the node in a list of neighbor nodes. If the number of neighboring nodes is greater than target number, the transmission power can be reduced (down to, if desired, a minimum transmission power level). Conversely, if the number of neighboring nodes is less than the target number, the transmission power can be increased (up to, if desired, a maximum transmission power level).

If desired, adjustments of transmission power level can also take into account the transmission power level of neighboring nodes. For example, communications nodes can also report their transmission power level when sending a beacon. Nodes can take into account the average transmission power level of neighboring nodes, and also adjust transmission power based on that average to attempt to equalize power levels. For example, when adjusting transmission power as a function of neighboring nodes, transmission power may be adjusted irrespective of the number of neighboring nodes if the transmission power is more than a predefined difference higher or lower than the average transmission power of adjacent nodes (and conversely the transmission power adjustment as a function of the number of neighboring nodes may be inhibited if the transmission power is more than a predefined difference higher or lower than the average transmission power of adjacent nodes).

Various alternate arrangements of a transmitter can be used. In some embodiments, the modulator 404 and upconverter can be combined 410. In other embodiments, modulation can be generated directly at the narrowband radio channel frequency. In yet other embodiments, the power controller 428 can control the power level in the modulator or upconverter. Accordingly, it is to be appreciated that the example transmitter 400 is not the only possible arrangement for a transmitter that can be used in a communications node in embodiments of the present invention.

Figure 5:
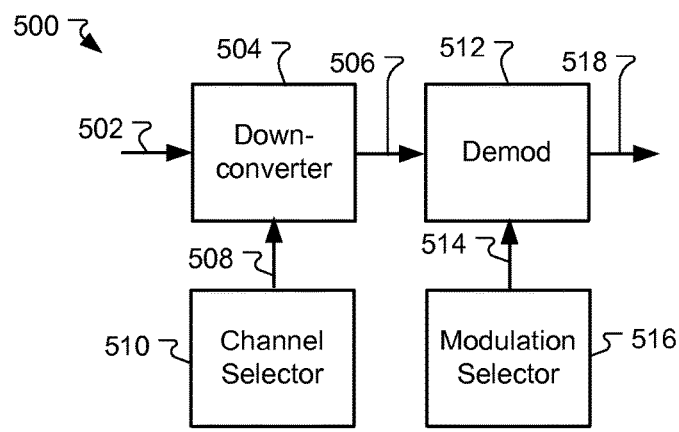
FIG. 5 is a block diagram of a receiver in accordance with some embodiments of the present invention.

FIG. 5 provides a detailed example of a receiver 500 according to some embodiments of the invention. The receiver 500 can be an example of the receiver 322 (FIG. 3). Thus, multiple receivers can be used in a receive subsystem 320 (FIG. 3). The receiver can accept an input radio signal 502 which is provided to a downconverter 504. The downconverter can convert the radio frequency signal at a desired channel frequency to a baseband or intermediate frequency signal 506. For example, the desired channel frequency 508 can be controlled by a channel selector 510. The channel selector can operate similarly as the channel selector 426 (FIG. 4) in the transmitter 400 (FIG. 4) discussed above.

The baseband or intermediate frequency signal 506 can be demodulated by a demodulator 512. The demodulator can use a modulation format 514 specified by a modulation selector 516. The modulation selector can operate similarly to the modulation selector 424 (FIG. 4) in the transmitter 400 (FIG. 4) discussed above. The demodulator can include a forward error correction decoder to correct reception errors when structured redundancy has been inserted by an encoder at a modulator.

Various alternate arrangements of a receiver can be used. In some embodiments, the downconverter 504 and demodulator 512 can be combined. Accordingly, it is to be appreciated that the example receiver 500 is not the only possible arrangement for a receiver that can be used in a communications node in embodiments of the present invention.

Figure 8:
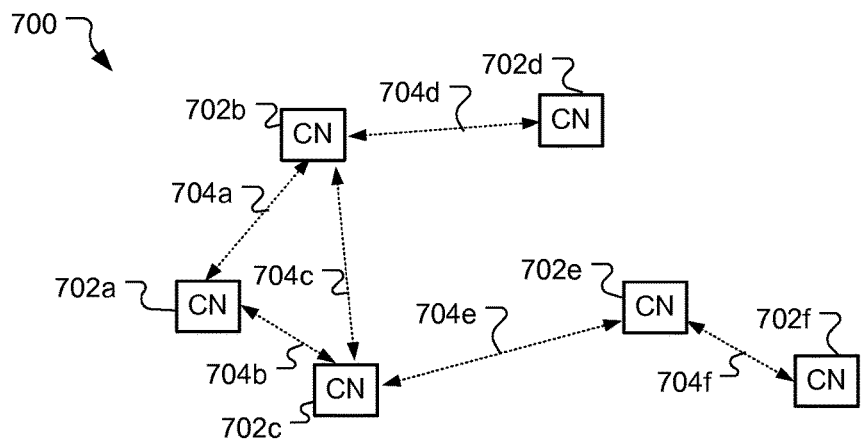
FIG. 8 is a block diagram of a receive subsystem in accordance with some embodiments of the present invention.

FIG. 8 illustrates an alternate arrangement of a receive subsystem 800. The receive subsystem includes an input 802, which can be an antenna connector. The input provides radio frequency signals to a plurality of downconverters 804. Each of the downconverters can be tuned to a different channel frequency, for example, a channel frequency 806 specified by a channel selector 808. The downconverted signals 810 can be provided to a combiner 812 which combines the downconverted signals together, and supplies the combined signal 814 to a detector 816, time/frequency estimator 818 and control symbol decoder 820. The detector can be used to detect when a signal is being received, for example, using correlation techniques as described above. The time/frequency estimator can be used to estimate frequency offset (and, if desired, phase offset), for example, using correlation techniques as described above. The time/frequency estimator can supply phase/frequency adjustments 822 to time/frequency adjusters 824. The time/frequency adjusters can adjust the phase/frequency of the downconverted signals 810 to provide aligned signals 827 to the demodulators 828. The downconverted signals can be, for example, digitized baseband signals. Various ways of detecting time/frequency can be used, including for example, a correlator, as described above.

The control symbol decoder 820 can be used to decode control symbols. For example, control symbols can specify the modulation format being used or other parameters. These parameters 826 can be provided to a plurality of demodulators 828.

The demodulators 828 can demodulate the aligned signals 827 to produce a plurality of data streams 830. The data streams can be recombined in a multiplexer 832 to provide a high speed output data stream 834. The receive subsystem 800 can include a channel selector 808 which operates similarly as channel selector 510 described above.

Sources and destination for data transmissions can be determined in various ways. For example, traffic can be contained within Internet Protocol (IP) packets, and source and destination specified by IP address. Routing within the system can be determined using various algorithms, such as for example, Ad hoc On-demand Distance Vector (AODV). In AODV, periodic beacon transmissions from the communications nodes are used to determine which communications nodes can receive from each other. Communications nodes can thus build up a neighbor list of neighboring communications nodes with which they can establish a communications link. When a communications node receives data for transmission to a destination, the node can transmit the data immediately if the destination is in its neighbor list. If the destination is not in the neighbor list, but a known route exists, the transmission is sent to the neighbor indicated in the route. If no route is known, the node can broadcast a routing request to all neighboring nodes. Each node receiving the routing request will retransmit the routing request if it does not know a route, or will send a reply back if it does know a route. The routing information will then propagate back to the original requester. Each node can create routing tables with routing information learned from responses to routing requests. Once the route has been determined, the node can transmit the data to the neighbor as specified by the routing information.

Routing information can be set to expire after a predetermined timeout. Routing information can also be adjusted based on reception (or non reception) of hello beacons. If a communications link within a route is no longer operating (e.g., as indicated by non receipt of hello beacons), the route can be deleted.

To avoid the so-called grey zone problem (e.g., where short hello beacon packets can be reliably received, but longer data packets cannot be reliably received), hello beacon transmissions can be made at a reduced power level. For example, the power level used for transmission of hello beacons can be less than the maximum power level, or set to a power level based on the average power level of neighboring nodes.

It is possible in some cases for a link to be unidirectional, for example due to local interference at one end of the communications link. In such a case, a communications node can maintain a black list of neighboring communications nodes which it can receive from, but to which transmissions to the neighboring communications nodes are not received by the neighboring communications nodes. The communications node can therefore ignore any transmissions received from nodes on the black list. This can help to avoid wasted system capacity.

Figure 6:
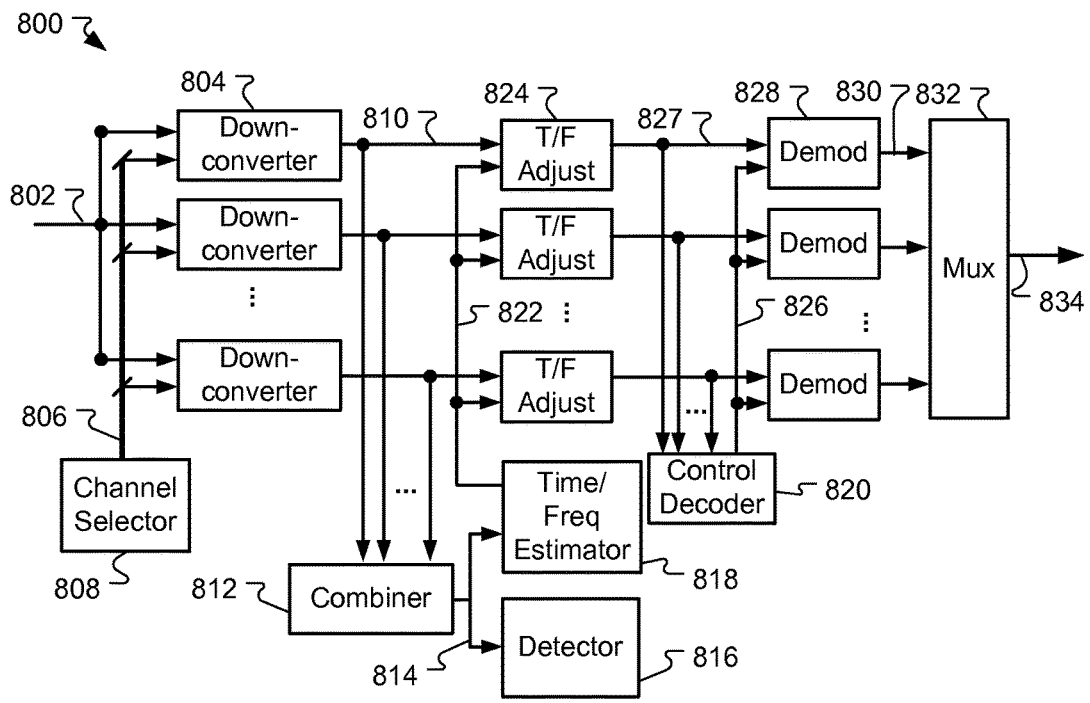
FIG. 6 is a flow chart of a method of communication in accordance with some embodiments of the present invention.

FIG. 6 illustrates a flow chart of a method of communication in a wireless mesh network having a plurality of communications nodes. For example, the method can be used in a system like the system 100 of FIG. 1. The method is shown generally at 600 in FIG. 6. The method can include selecting 602 a plurality of narrowband radio channels. The narrowband radio channels can be selected using techniques as described above. The narrowband radio channels need not be contiguous.

The method 600 can also include establishing 604 a plurality of communications links between the communications nodes to form an at least partially connected mesh network. For example, communications links can be provided between various pairs of communications nodes within the system. Unlike a hub and spoke network, the method can include communications from node to node to node. For example, a first communications node can establish a communications link with both a second communications node and a third communications node. The second and third communications node can also establish a communications link between each other. Accordingly, communications between nodes within the system need not pass through a central or hub node. Communications between nodes needs only pass through relay nodes when a direct communications link does not exist between a pair of nodes.

Establishing the communications links can take advantage of the multiple narrowband radio channels to provide for rapid, low latency establishment of synchronization. Accordingly, establishing the communications links can include transmitting 606 synchronization data from a first one of the plurality of communications nodes on at least two of the plurality of radio channels. The synchronization data can be transmitted synchronously across the at least two of the plurality of radio channels. At a second one of the plurality of communications nodes the method can include combining 608 energy received from the at least two of the plurality of radio channels to provide a combined signal and synchronizing 610 the second one of the plurality of communications nodes to the first one of the plurality of communications nodes using the combined signal. For example, the combined signal can be processed as described above.

The method can include communicating data between communications nodes as will now be described. For example, communicating data can include demultiplexing a high rate data stream into at least two lower rate data streams and transmitting each stream on a different one of the plurality of radio channels. As for the synchronization data, the symbol boundaries of the transmitted data can be synchronized across each of the plurality of radio channels used for transmission. Reception can include receiving each of the at least two lower rate data streams and multiplexing the at least two lower rate data streams back together into a single high rate data stream.

The method can also include adjusting transmission power, modulation modes, and the channels selected for transmission. For example, the method can include accepting data and determining a destination for the data. A transmission power level can be selected based on the destination. The data can then be transmitted, with portions of the data sent on each of at least two of the plurality of radio channels to the destination using the transmission power level. As another example, the method can include selecting a transmission power level based on the priority of the data.

The method can include selecting the at least two narrowband radio channels based on a source or destination of the data. For example, when receiving data from a source, different channels may be used depending on the capability of the source node as described above. As another example, when transmitting data to a destination, different channels may be used depending on the capability of the destination node as described above.

Selecting the narrowband radio channels can also be based on a signal to noise condition on the communications link, for example, as described above.

The method can include selecting a modulation format for each of the plurality of narrowband radio channels. The selecting can be based on any of a destination of signals to be transmitted, a source of signals to be received, and a signal to noise condition on the communications link. For example, the source or destination may only be capable of operating in certain modulation modes as described above. As another example, different modulation formats may be desirable based on the signal to noise ratio conditions as described above. The narrowband radio channels can each use the same modulation format, although this is not essential. For example, when different signal to noise ratios are present on each channel, the modulation format for each channel can be selected to provide a desired tradeoff between data rate and error rate. In such a case, it will be appreciated that the channels may not provide the same data rates. As a specific example, a data rate of 80 kbps can be demultiplexed into one stream at 40 kbps, one stream at 20 kbps, and two streams each at 10 kbps. The 40 kbps stream may be transmitted on the highest signal to noise ratio channel using a high order modulation format (e.g., 16-DPSK) while the 10 kbps streams are transmitted on the lowest signal to noise ratio channels using a low order modulation format (e.g., 2-DPSK). As other examples, a data rate of 80 kbps can be demultiplexed into two streams at 40 kbps, four streams at 20 kbps, ten streams at 8 kbps, etc.

Returning to FIG. 1, because the system 100 uses narrowband radio channels, maintaining accurate transmission/reception frequencies can be desirable. Conventionally, to provide highly accurate transmission/reception frequencies has required providing accurate and stable frequency references in each of the communications nodes. This can prove expensive and cumbersome. For example, periodic maintenance of frequency references can be difficult to perform if the communications nodes are difficult to access (e.g., geographically dispersed and/or mounted on power poles, etc.).

Figure 7:
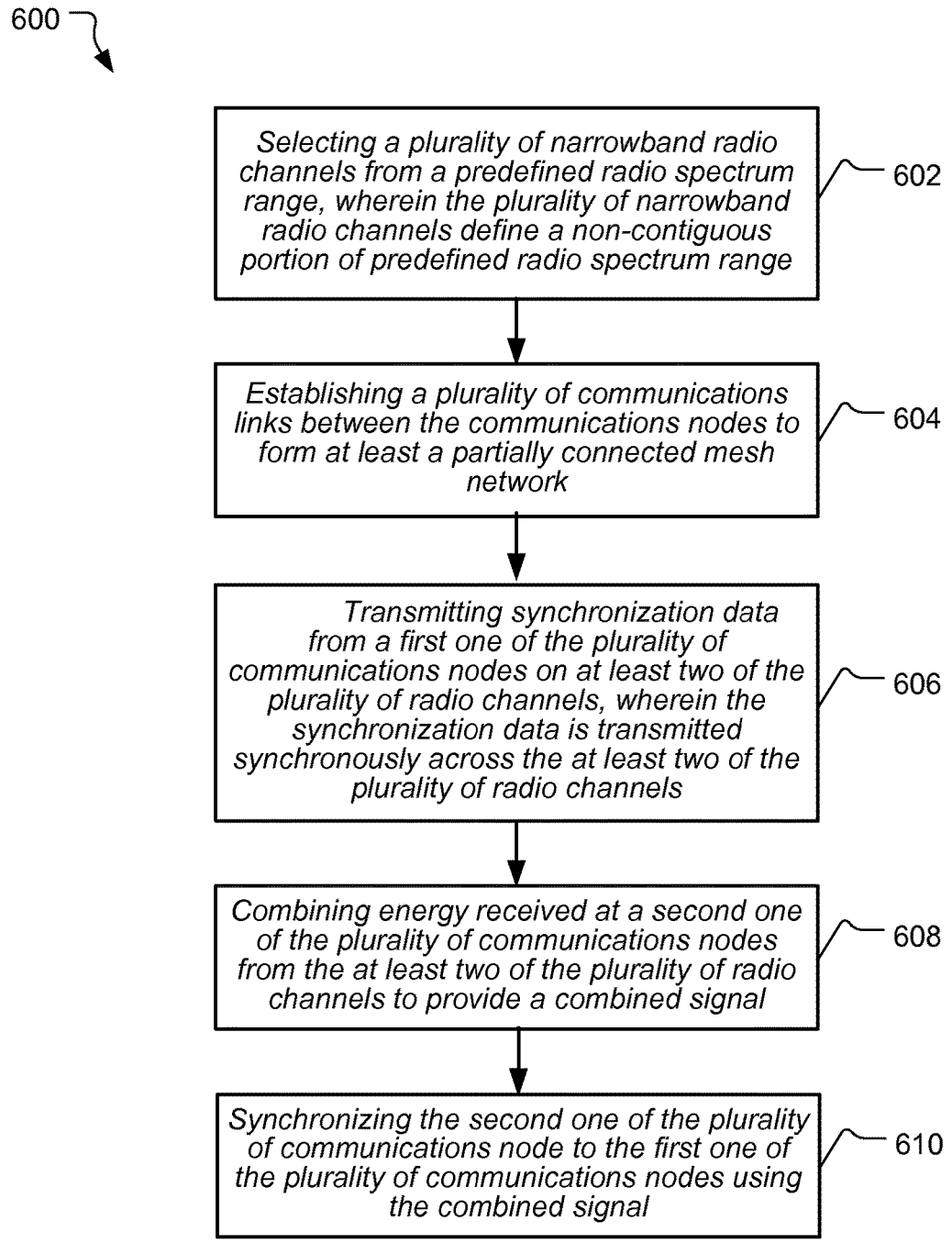
FIG. 7 is a block diagram of a partially connected wireless mesh network in accordance with some embodiments of the present invention.

Accordingly, if desired, the system 100 can include a means for distributing frequency reference calibration to the plurality of communications nodes 102 using peer to peer flood routing over the plurality of wireless communications links 104. A single, initial node in the network can be recalibrated, and then frequency reference updates propagated throughout the network to ensure that all nodes are recalibrated. The initial node need not be a centrally located or "master" node (in contrast to a hub-spoke network). For example, FIG. 7 will be used to describe a process of distributing frequency reference calibration over a system. The system 700 can be like the system 100, the communications nodes 702 can be like the communications nodes 102, and the communications links can be like the communications links 104 of FIG. 1.

A reference communications node 702a can provide an initial calibration reference. For example, the reference communications node can be calibrated by an operator using a frequency standard external to the system. As another example, the reference communications node made have a highly accurate frequency reference (e.g., a frequency reference having stability of one part-per-billion as compared to other nodes in the system which use a frequencies references having stability of one part-per-million). The reference communications node can transmit a frequency reference update to neighboring nodes. For example, the reference communications node can transmit a frequency reference update message to each of neighboring nodes 702b and 702c via communications links 704a and 704b. The frequency reference update transmission can be a broadcast message.

The communications nodes which receive the frequency reference update message can perform a frequency calibration operation. For example, communications node 702b (which can be an example of a first communications node) can receive the frequency reference update from communications node 702a. Communications node 702b can measure a frequency offset of the frequency reference update message, for example using correlation techniques as described above. As another example, the communications node can demodulate the information in the frequency reference update message, verify that the demodulation is correct (e.g., through a cyclical redundancy check word), remodulate the information, and use the remodulated information as a training sequence for a frequency estimator. After the frequency offset has been measured, it can be stored and used to apply an appropriate frequency offset correction during transmissions. If desired, frequency offset for multiple frequency reference update messages can be measured and averaged together to improve accuracy. If desired, frequency offset change with time (drift) can be measured and compensated for to provide improved accuracy.

Each node which has received a frequency reference update message can then retransmit the frequency reference update to other neighboring nodes. For example, communications nodes 702b and 702c can each retransmit the frequency reference update message, thus providing it to communications nodes 702d (which can be an example of a second communications node) and 702e.

Nodes which have already received the frequency reference update message can ignore the frequency reference update when received a second time. For example, frequency reference update messages can be time stamped to enable a node to determine if it has already received the frequency reference update. For example, since nodes 702b and 702c have already received the frequency reference update, they can ignore the retransmission from each other.

Frequency reference update messages can propagate through the system, until every node has received the frequency reference update. For example, when node 702*f* receives the frequency reference update from node 702*e*, it need not retransmit the frequency reference update, since it received it from its only neighbor.

Frequency reference updates can occur using regular data messages transmitted through the system. For example, communications nodes can make frequency offset measurements on message received from other nodes, and when appropriate, perform a frequency reference update based on the frequency offset measurement. For example, regular data messages can include a flag which indicates whether the transmitting node has performed a frequency reference update. A receiving node can thus perform a frequency reference update when receiving a data message with the flag set, and after performing a frequency reference update can set this flag when transmitting data to other nodes.

The system can also include means for distributing updated communications software to the plurality of communications nodes. For example, flood routing can also be used to distribute communication software updates in a manner similar to frequency reference updates. Updated communications software can be provided to a communications node that modifies or enhances communications nodes capabilities with respect to modulation formats, error correction coding, routing protocols, etc. The updated communication software can be provided to a first communications node. The updated communication software can then be broadcast from the first communications node across each communications link from the first communications node (thus, e.g., to a second communications node). Each communications node receiving the software update can then broadcast the software update across each communications link they have (except links on which the software update was already received from). In this manner, each communications node within the network can receive updated communication software. After receipt of the updated communications software, the communications nodes can begin using the updated communications software immediately, at a specified future time, or upon receipt of a command.

A wireless mesh network using the techniques just described above can advantageously provide high data rate, low latency communications even when the network is limited to operation using narrowband radio channels. As described above, data can be split into multiple lower data rate streams which are transmitted across multiple narrowband channels. Higher data rate transmission can help to reduce latency, for example, in communications of time sensitive fault or reconfiguration data. Latency can be further reduced by taking advantage of the multiple channels during initial establishment of communications links by combining energy across the multiple channels when synchronizing two communications nodes together.

While several illustrative applications have been described, many other applications of the presently disclosed techniques may prove useful. Accordingly, the above-referenced arrangements are illustrative of some applications for the principles of the present invention. It will be apparent to those of ordinary skill in the art that numerous modifications can be made without departing from the principles and concepts of the invention as set forth in the claims.

The invention claimed is:

1. A method of communications in a wireless mesh network having a plurality of communications nodes, the method comprising:

selecting a plurality of narrowband radio channels from a predefined radio spectrum range, wherein the plurality of narrowband radio channels define a non-contiguous portion of predefined radio spectrum range; and establishing a plurality of wireless communications links between the communications nodes to form an at least partially connected mesh network, wherein said establishing comprises:

transmitting synchronization data from a first one of the plurality of communications nodes on at least two of the plurality of radio channels, wherein the synchronization data is transmitted synchronously across the at least two of the plurality of radio channels;

combining energy received at a second one of the plurality of communications nodes from the at least two of the plurality of radio channels to provide a combined signal;

synchronizing the second one of the plurality of communications node to the first one of the plurality of communications nodes using the combined signal; and at the first one of the plurality of communications nodes:

demultiplexing a high rate data stream into at least two lower rate data streams, and transmitting each of the at least two lower rate data streams on a different one of the plurality of channels, wherein symbol boundaries on each of the plurality of narrowband radio channels are concurrent; and at the second one of the plurality of communications nodes:

receiving each of the at least two lower rate data streams; and multiplexing the at least two lower rate data streams into a single high rate data stream.

2. The method of claim 1, wherein the establishing a plurality of wireless communications links comprises:

establishing a wireless communications link between the first one of the plurality of communications nodes and the second one of the plurality of communications nodes;

establishing a wireless communications link between the first one of the plurality of communications nodes and a third one of the plurality of communications nodes; and establishing a wireless communications link between the second one of the plurality of communications nodes and the third one of the plurality of communications nodes.

3. The method of claim 1, wherein each of the plurality of narrowband radio channels has a bandwidth less than 125 kilohertz.

4. The method of claim 3, wherein each of the plurality of narrowband channels has a bandwidth of 25 kHz.

5. The method of claim 3, wherein each of the plurality of narrowband channels has a bandwidth of 12.5 kHz.

6. The method of claim 5, further comprising communicating data between ones of the plurality of nodes, wherein the data is communicated at a data rate of at least 40 kilo-bits-per-second.

7. The method of claim 1, further comprising:

accepting data at one of the communications nodes;

determining a destination for the data;

selecting a transmission power level based on the destination; and communicating portions of the data on at least two of the plurality of radio channels to the destination using the transmission power level.

8. The method of claim 1, further comprising:
accepting data at one of the communications nodes;
determining a priority of the data;
selecting a transmission power level based on the priority; and
transmitting portions of the data on at least two of the plurality of radio channels to a destination using the transmission power level.

9. The method of claim 1, further comprising:
upconverting symbol data for each of the at least two of the plurality of narrowband radio channels to a radio frequency to form a radio frequency signal; and
combining each of the radio frequency signals into a single antenna for transmission.

10. The method of claim 1, wherein the transmitting further comprises performing a transmit filtering operation so that transmitted signals on each of the at least two of the plurality of radio channels meet a predefined narrowband channel spectral containment mask.

11. The method of claim 1, further comprising selecting the at least two narrowband radio channels based on any of: a source of the data and a destination of the data.

12. The method of claim 1, further comprising selecting the at least two narrowband radio channels based on a signal to noise condition.

13. The method of claim 1, further comprising selecting a modulation format for each of the plurality of narrowband radio channels, wherein the selecting is performed based on any of: a destination of signals to be transmitted, a source of signals to be received, a signal to noise condition at the first communications node, and a signal to noise condition at the second communications node.

14. The method of claim 1, further comprising:
receiving updated communications software at the first one of the plurality of communications nodes via the plurality of narrowband radio channels;
transmitting the updated communications software to the second one of the plurality of communications nodes via the plurality of narrowband radio channels; and
using the updated communications software at the first one of the plurality of communications nodes.

15. The method of claim 1, further comprising:
receiving a frequency reference update at the first one of the plurality of communications nodes via the plurality of narrowband radio channels;
transmitting a frequency reference update to the second one of the plurality of communications nodes via the plurality of narrowband radio channels; and
adjusting reference frequencies used in the transmitting and the receiving based on the frequency reference update.

16. The method of claim 1, wherein each of the plurality of wireless communications links uses the same at least two of the plurality of narrowband radio channels.

17. A system comprising:
a plurality of communications nodes;
transmitter is configured to establish a plurality of wireless communications links between ones of the plurality of communications nodes to form an at least partially connected mesh network, wherein said establishing comprises:
the transmitter is configured to transmit synchronization data from a first one of the plurality of communications nodes via at least two non-contiguous narrowband radio channels, wherein the synchronization data is transmitted synchronously across the at least two non-contiguous narrowband radio channels;
detector is configured to combine energy received at a second one of the plurality of communications nodes from the at least two non-contiguous narrowband radio channels to provide a combined signal; and
receiver is configured to synchronize the second one of the plurality of communications node to the first one of the plurality of communications nodes using the combined signal; wherein each of the plurality of communications nodes further comprises:
a demultiplexer configured to demultiplex a input data stream at a first rate into at least two transmit data sub streams each at a second rate, the second rate being lower than the first rate; and
the transmitter comprising a plurality of transmitters coupled to the demultiplexer and configured to transmit each of the at least two transmit data sub streams on a different one of the plurality of channels, wherein symbol boundaries on each of the plurality of narrowband radio channels are concurrent; and
the receiver comprising a plurality of receivers configured to receive at least two receive data sub streams at the second rate; and
a multiplexer configured to multiplex the at least two receive data sub streams into an output data stream at the first rate.

18. The system of claim 17, further comprising a power controller configured to adjust transmission power based on any of: a destination of the input data stream, a priority of the input data stream.

19. The system of claim 17, wherein each of the communications nodes further comprises selector is configured to select the at least two non-contiguous narrowband radio channels based on a communications condition of the one of the plurality of wireless communications links between a source one of the plurality of communications nodes and a destination one of the plurality of communications nodes.

20. The system of claim 17, wherein each of the communications nodes further comprises selector to select a modulation format based on a communications condition of the one of the plurality of communications links between a source one of the plurality of communications nodes and a destination one of the plurality of communications nodes.

21. The system of claim 17, further comprising distributor to distribute updated communication software to the plurality of communications nodes using peer to peer flood routing over the plurality of wireless communications links.

22. The system of claim 17, further comprising distributor to distribute frequency reference calibration to the plurality of communications nodes using peer to peer flood routing over the plurality of wireless communications links.

23. A communications node comprising:
a demultiplexer configured to demultiplex data at a first data rate into a plurality of transmit synchronization data streams at a second data rate, the second data rate being less than the first data rate;
a transmit subsystem coupled to the demultiplexer and comprising a plurality of transmitters, each of the transmitters is configured to transmit one of the transmit synchronization data streams on a different non-contiguous one of a plurality of narrowband radio channels to a second communications node, wherein the transmit synchronization data streams are transmitted synchronously across at least two non-contiguous narrowband radio channels and symbol boundaries on each of the plurality of narrowband radio channels are concurrent, the plurality of transmitters are configured to establish a plurality of wireless communication links with multiple communications nodes to form an at least partially connected mesh network;

a receive subsystem comprising a plurality of receivers, each of the receivers is configured to receive a receive synchronization data stream from a third communications node at a third data rate on a different non-contiguous one of the plurality of narrowband radio channels; and a multiplexer coupled to the receive subsystem and configured to multiplex receive synchronization data streams together into a combined data at a fourth data rate, the fourth data rate being greater than the third data rate; the plurality of receivers are configured to synchronize with the third communications node using the combined data.

24. The communications node of claim 23, wherein receive subsystem comprises a detector configured to combine energy across the plurality of narrowband radio channels to detect a beginning of a transmission.

25. The communications node of claim 23, wherein the transmit subsystem comprises a power controller configured to adjust transmission power based on a destination of the transmit data streams.

26. The communications node of claim 23, wherein the transmit subsystem comprises a power controller configured to adjust transmission power based on a priority of the transmit data streams.

27. The communications node of claim 23, wherein the transmit subsystem comprises a plurality of transmit filters, each transmit filter configured to meet a predefined narrowband channel spectral containment mask.

28. The communications node of claim 23, further comprising a channel selector configured to select each of the different non-contiguous ones of the plurality of narrowband radio channels based on any of: a destination of the transmit data streams, and a source of the receive data streams.

29. The communications node of claim 23, further comprising a modulation selector configured to select a modulation format based on any of: a destination of the transmit data streams, a source of the receive data streams, and a signal to noise ratio on the different non-contiguous ones of the plurality of narrowband radio channels.

30. The communications node of claim 23, wherein the transmit subsystem comprises a plurality of modules, each module comprising ones of the plurality of transmitters, and a variable number of modules are installed into the transmitter subsystem to provide a desired number of transmitters.

31. The communications node of claim 30, wherein the receive subsystem comprises a plurality of modules, each module comprising ones of the plurality of receivers, and a variable number of modules are installed into the receive subsystem to provide a desired number of receivers.

32. A system comprising a plurality of communications nodes as in claim 23 arranged to form an at least partially connected mesh network.

* * * * *